(12) United States Patent
Dong et al.

(10) Patent No.: US 10,591,322 B2
(45) Date of Patent: Mar. 17, 2020

(54) THROUGH-BEAM MULTI-DIGIT DRY METER

(71) Applicant: JINAN RICHNES ELECTRONIC CO. LTD, Shandong (CN)

(72) Inventors: Liangcheng Dong, Shandong (CN); Wenchun Wang, Shandong (CN); Weiguo Yu, Shandong (CN)

(73) Assignee: JINAN RICHNES ELECTRONIC CO.LTD, Jinan, Shandong (CN)

( * ) Notice: Subject to any disclaimer, the term of this patent is extended or adjusted under 35 U.S.C. 154(b) by 322 days.

(21) Appl. No.: 15/542,642

(22) PCT Filed: Aug. 7, 2015

(86) PCT No.: PCT/CN2015/000576
§ 371 (c)(1),
(2) Date: Jul. 10, 2017

(87) PCT Pub. No.: WO2016/205981
PCT Pub. Date: Dec. 29, 2016

(65) Prior Publication Data
US 2017/0363449 A1   Dec. 21, 2017

(30) Foreign Application Priority Data

Jun. 26, 2015 (CN) .......................... 2015 1 0360502
Jun. 26, 2015 (CN) ..................... 2015 2 0446535 U

(51) Int. Cl.
*G01D 7/00* (2006.01)
*G01D 4/02* (2006.01)
*G01D 13/08* (2006.01)

(52) U.S. Cl.
CPC ................. *G01D 7/00* (2013.01); *G01D 4/02* (2013.01); *G01D 13/08* (2013.01)

(58) Field of Classification Search
CPC .. G01D 4/00; G01D 5/32; G01D 5/34; G01D 5/347; G01D 7/00; G01D 13/08; G01D 4/02
(Continued)

(56) References Cited

U.S. PATENT DOCUMENTS 3,382,369 A * 5/1968 Weyrauch .............. G01D 5/347
 250/237 R
3,745,798 A * 7/1973 Pieddeloup ......... E05B 37/0044
 70/306

(Continued)

FOREIGN PATENT DOCUMENTS

CN       1955665 A  * 10/2005
CN    201555624 U  *  4/2009
(Continued)

OTHER PUBLICATIONS

English translation of CN 203982492.*
(Continued)

*Primary Examiner* — Nimeshkumar D Patel
*Assistant Examiner* — Tania Courson

(57) ABSTRACT

A through-beam multi-digit dry meter is disclosed, wherein a lower and an upper holding plate are fastened together; two brackets are integrally connected on the lower holding plate. A 180° curved frame is between the brackets, on which is a flexible printed circuit. Engagement holes are in the brackets. A light-transmitting hollow character wheel shaft is in the engagement holes. Character wheels are on the light-transmitting hollow character wheel shaft and made of light-transmitting material. On the left and/or right side of a character wheel, short black strips are stamped. Long black strips are stamped on the character part of the character wheel head to tail, on which numbers are printed. The meter enables direct reading of three to eight character wheels to measure gas, electricity of water of large flow within the (Continued)

national standard limitation, which is easy to produce and assemble and saves the cost.

7 Claims, 3 Drawing Sheets

(58) Field of Classification Search
USPC .......................................................... 116/299
See application file for complete search history.

(56) References Cited

U.S. PATENT DOCUMENTS

| | | | | |
|---|---|---|---|---|
| 3,916,785 | A * | 11/1975 | Burger | B41J 5/04 |
| | | | | 101/45 |
| 2017/0069439 | A1 * | 3/2017 | Wrede | H01H 9/0033 |
| 2018/0188078 | A1 * | 7/2018 | Grau | G01D 5/344 |

FOREIGN PATENT DOCUMENTS

| | | | |
|---|---|---|---|
| CN | 203163804 U | * | 4/2013 |
| CN | 203595542 U | * | 11/2013 |
| CN | 103791938 A | * | 1/2014 |
| CN | 103791971 A | * | 1/2014 |
| CN | 203982492 U | * | 8/2014 |

OTHER PUBLICATIONS

English translation of CN 103791971.*
English translation of CN 103791938.*
English translation of CN 203595542.*
English translation of CN 203163804.*
English translation of CN 201555624.*
English translation of CN 1955665.*
English translation of ISR from parent case PCT/2015/000576.*

* cited by examiner

THROUGH-BEAM MULTI-DIGIT DRY METER

CROSS REFERENCE OF RELATED APPLICATION

This is a U.S. National Stage under 35 U.S.C 371 of the International Application PCT/CN2015/000576, filed Aug. 7, 2015, which claims priority under 35 U.S.C. 119(a-d) to CN 201510360502.X, filed Jun. 26, 2015; and CN 201520446535.1, filed Jun. 26, 2015.

BACKGROUND OF THE PRESENT INVENTION

Field of Invention

The present invention relates to a meter, and more particularly to a through beam multi-digit dry meter for gas, electricity, water and etc.

Description of Related Arts

The conventional gas meter, water meter, electricity meter and etc. enables direct reading and long-distance transmission, which no longer need the working staff to visit and check the meter. The data is able to be long-distance transmitted to the computer by the sensors installed on the meters. The working theory of the meter for measuring the flow of gas, liquid, electricity and etc. is that the gas, liquid and electricity medium passes through the flow detection device inside the meter; the flow detection device drives the transmission device which rotates the character wheel; the numbers on the character wheel shows the amount of rotation. With rapid development of the economy and continuous improvement of the living level, the consumption of gas, electricity and water becomes larger and larger, especially in factories where water consumption is huge. Meter which obtains three or four character wheels or even five character wheels is no longer able to meet the needs. Due to the space limitation of the national standard, direct reading of seven or eight character wheels from the meter is not able to be achieved. Besides, components of the meter need to be assembled by worker one by one, which is extremely complicated. The meter is too small for a worker to operate. The conventional meter is difficult to assembly. The error rate of the conventional meter is high.

SUMMARY OF THE PRESENT INVENTION

An object of the present invention is to provide a through-beam multi-digit dry meter which is easy to produce and assemble with low cost. The present invention enables direct reading of multi-digit numbers and compensates the insufficiency of the conventional technology.

The present invention is carried out with the below technical solution:

through-beam multi-digit dry meter, comprising: a lower holding plate and an upper holding plate fastened together, wherein two one body formed brackets are set on the lower holding plate; a 180° curved frame is set between the two brackets; a FPC (flexible printed circuit) is set on the curved frame; engagement holes are opened on the two brackets; a light-transmitting hollow character wheel shaft is set on the engagement holes; character wheels are set on the light-transmitting hollow character wheel shaft, wherein the character wheels are made of light-transmitting material; short black strips are hot stamped on the left and/or right side of the character wheels; long black strips are hot stamped on the character wheels head to tail; numbers are printed on the long black strips connected head to tail.

The short black strips comprises a first short black strip, a second short black strip and a third short black strip; a central angle corresponds to the first short black strip is 24°; a central angle corresponds to the second short black strip is 60°; a central angle corresponds to the third short black strip is 96°; an interval between the first short black strip and the second short black strip corresponds to a central angle of 96°; an interval between the second short black strip and the third short black strip corresponds to a central angle of 24°.

A PCB (printed circuit board) is set inside the light-transmitting hollow character wheel shaft; receiving tubes which are one-to-one corresponding to the character wheels are set inside the PCB; groups of transmitting tubes are welded on the FPC; every group of the transmitting tube is corresponding to a character wheel; every group of the transmitting tube comprises five transmitting tubes.

A central angle which corresponds to the FPC is 180°; five transmitting tubes are set on the FPC with a central angle of 18°, 54°, 90°, 126° and 162° respectively.

The character wheels comprise three to eight character wheels.

Two clamping blocks are set on the upper holding plate; the two clamping blocks are clamped into the two brackets on the lower holding plate.

Two stirring gear are set on one side of the character wheels which are hot stamped with the short black strips.

The benefits of the present invention are the meter enables direct reading of three to eight character wheels to measure gas, electricity of water of large flow within the national standard limitation. The present invention enables direct reading of multi-digit number, which is easy to produce and assemble and saves the production cost.

Figure 1:
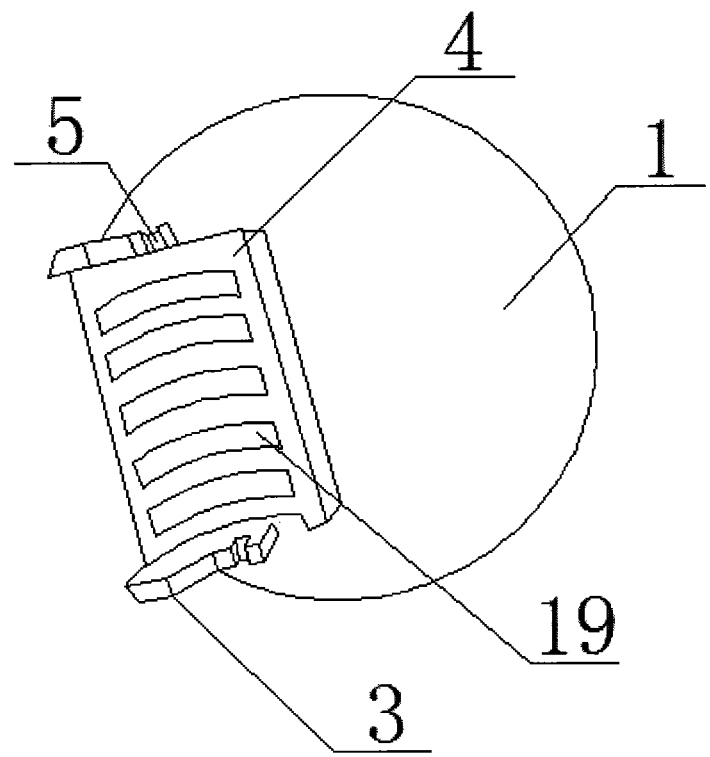
FIG. 1 is a perspective view of a lower holding plate.
Figure 2:
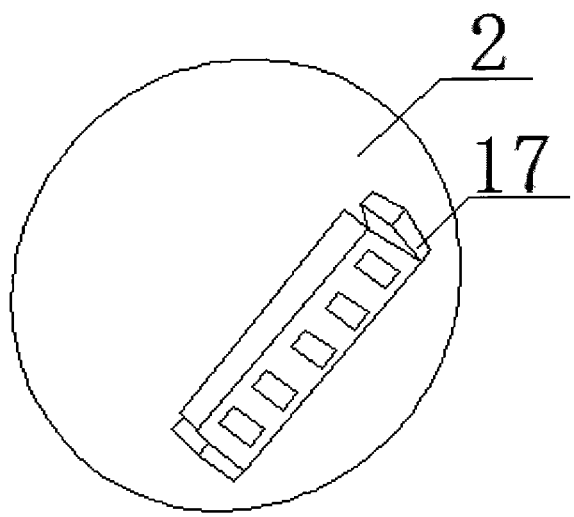
FIG. 2 is a perspective view of an upper holding plate.
Figure 3:
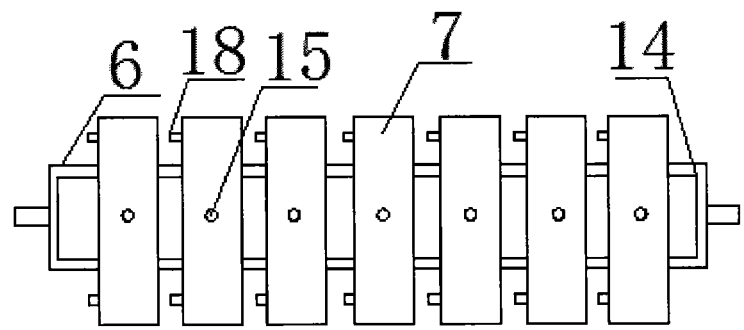
FIG. 3 is a perspective view of the assembling of character wheels.
Figure 4:
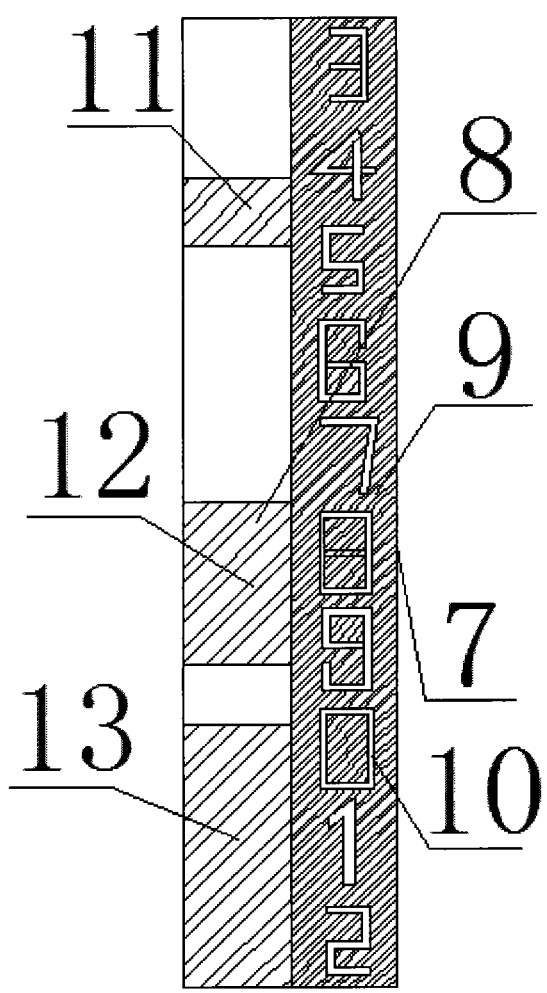
FIG. 4 is the perspective view of the spreading of a character wheel.
Figure 5:
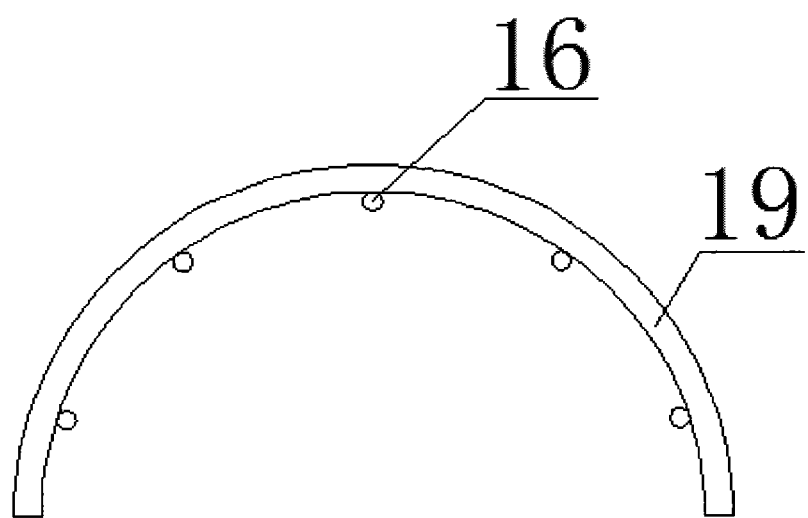
FIG. 5 is the perspective view of the assembling of transmitting tubes.

Element number: 1. lower holding plate; 2. upper holding plate; 3. bracket; 4. curved frame; 5. engagement hole; 6. light-transmitting hollow character wheel; 7. character wheel; 8. short black strip; 9. long black strip; 10. number; 11. first short strip; 12. second short black strip; 13. third short black strip; 14. PCB (printed circuit board); 15. receiving tube; 16. transmitting tube; 17. clamping block; 18.stirring gear; 19. FPC (flexible printed circuit)

DETAILED DESCRIPTION OF THE PREFERRED EMBODIMENT

Referring to the drawings, according to a preferred embodiment of the present invention is illustrated, wherein a lower holding plate 1 and an upper holding plate 2 are fastened together, wherein two one body formed brackets 3 are set on the lower holding plate 1; a 180 degree curved frame 4 is set between the two brackets 3; a FPC (flexible printed circuit) 19 is set on the curved frame 4; engagement holes 5 are opened on the two brackets 3; a light-transmitting hollow character wheel shaft 6 is set on the engagement holes; character wheels 7 are set on the light-transmitting hollow character wheel shaft 6, wherein the character wheels 7 are made of light-transmitting material; short black strips 8 are hot stamped on the left and/or right character wheels 7; long black strips 9 are hot stamped on the character wheels 7 head to tail; numbers 10 are printed on the long black strips 9 connected head to tail. The short black strips 8 comprises a first short black strip 11, a second short black strip 12 and a third short black strip 13; wherein a central angle subtended to the first short black strip 11 is 24°; a central angle subtended to the second short black strip 12 is 60°; a central angle subtended to the third short black strip 13 is 96°; an interval between the first short black strip 11 and the second short black strip 12 subtends to a central angle of 96°; an interval between the second short black strip 12 and the third short black strip 13 subtends to a central angle of 24°. A PCB (printed circuit board) 14 is set inside the light-transmitting hollow character wheel shaft 6; receiving tubes 15 which are one-to-one corresponding to the character wheels 7 are set inside the PCB 14; groups of transmitting tubes 16 are welded on the FPC 19; every group of the transmitting tube 16 is corresponding to a character wheel 7; every group of the transmitting tube 16 comprises five transmitting tubes. A central angle which corresponds to the FPC 19 is 180°; five transmitting tubes 16 are set on the FPC with a central angle of 18°, 54°, 90°, 126°, 162° respectively. The character wheels 7 comprise three to eight character wheels. Two clamping blocks 17 are set on the upper holding plate 2; the two clamping blocks 17 are clamped into the two brackets 3 on the lower holding plate 1. Two stirring gear 18 are set on a side of the character wheels 7 which are hot stamped with the short black strips 8.

In order to make the through-beam multi-digit dry meter of the present invention, open tooling for the brackets 3, the curved frame 4 and the lower holding plate 1 as a whole to avoid the trouble for assembly; open engagement holes 5 on the brackets 3; press the light-transmitting hollow character wheel shaft 6 with the character wheels 7 into the engagement holes 5; point the clamping block 17 to the brackets 3 and clamp the lower holding plate 1 with the upper holding plate; the assembly is easy, which saves time, energy and cost. The space for installation of the character wheels is limited by the national standard, the conventional technology enables installation of three to four character wheels and is incapable of installation of more character wheels; the character wheels 7 are made of light-transmitting material; long black strips 9 are hot stamped on one side of the character wheels 7, based on which white numbers 10 from 0-9 are printed; on the other side of the character wheels 7 short black strips are hot stamped at intervals; the transmitting tubes 16 is pointed to the receiving tube 15 and transmits signals; the signals is able to pass through places without the short black strips 8 and unable to reach the receiving tube 15 when passes through the short black strip 8; the five transmitting tubes 16 transmits in series, pass is denoted as 0 and not pass is denoted as 1, which forms a set of code; the set of code decides which number from 0 to 9 is shown on the character wheel 7. The structure is simple, easy to produce and assembly. The present invention significantly reduces the work load and cost. The central angle corresponds to the first short black strip 11 is 24°; the central angle corresponds to the second short black strip 12 is 60°; the central angle corresponds to the third short black strip 13 is 96°; the central angle corresponds to the interval between the first short black strip 11 and the second short black strip 12 is 96°; the central angle corresponds to the interval between the second short black strip 12 and the third short black strip 13 is 24°; The five transmitting tubes 16 is on the FPC 19 with a central angle of 18°, 54°, 90°, 126°, 162° respectively, which guarantees the uniqueness of the formed code while rotating the character wheels and ensures the accuracy of the numbers shown on the character wheels.

What is claimed is:

1. A through-beam multi-digit dry meter, comprising: a lower holding plate (1) and an upper holding plate (2) fastened together, wherein two brackets (3) are integrated on the lower holding plate (1); a 180 degree curved frame (4) is set between the two brackets (3); a FPC (flexible printed circuit) (19) is set on the curved frame (4); engagement holes (5) are opened on the two brackets (3); a light-transmitting hollow shaft of character wheels (6) is set on the engagement holes; the character wheels (7) are set on the light-transmitting hollow character wheel shaft (6), wherein the character wheels (7) are made of a light-transmitting material; short black strips (8) are hot stamped on a left side and/or a right side of the character wheels (7); long black strips (9) are hot stamped on the character wheels (7) head to tail; numbers (10) are printed on the long black strips (9) connected head to tail.

2. The through-beam multi-digit dry meter, as recited in claim 1, wherein the short black strips (8) comprise a first short black strip (11), a second short black strip (12) and a third short black strip (13); a central angle subtended to the first short black strip (11) is 24°; a central angle subtended to the second short black strip (12) is 60°; a central angle subtended to the third short black strip (13) is 96°; an interval between the first short black strip (11) and the second short black strip (12) subtends to a central angle of 96°; an interval between the second short black strip (12) and the third short black strip (13) subtends to a central angle of 24°.

3. The through-beam multi-digit dry meter, as recited in claim 1, wherein a PCB (printed circuit board) (14) is set inside the light-transmitting hollow character wheel shaft (6); receiving tubes (15) which are one-to-one corresponding to the character wheels (7) are set inside the PCB (14); groups of transmitting tubes (16) are welded on the FPC (19); every group of the transmitting tubes (16) is corresponding to one of the character wheels (7); a quantity of the transmitting tubes (16) is five for every group.

4. The through-beam multi-digit dry meter, as recited in claim 1, wherein a central angle subtended to the FPC (19) is 180°; five transmitting tubes (16) are set on the FPC with a central angle of 18°, 54°, 90°, 126° and 162° respectively.

5. The through-beam multi-digit dry meter, as recited in claim 1, wherein a quantity of the character wheels (7) is three to eight.

6. The through-beam multi-digit dry meter, as recited in claim 1, wherein two clamping blocks (17) are set on the upper holding plate (2); the two clamping blocks (17) are clamped into the two brackets (3) on the lower holding plate (1).

7. The through-beam multi-digit dry meter, as recited in claim 1, wherein two stirring gears (18) are set on a side of the character wheels (7) which are hot stamped with the short black strips (8).

* * * * *